Patented May 11, 1954

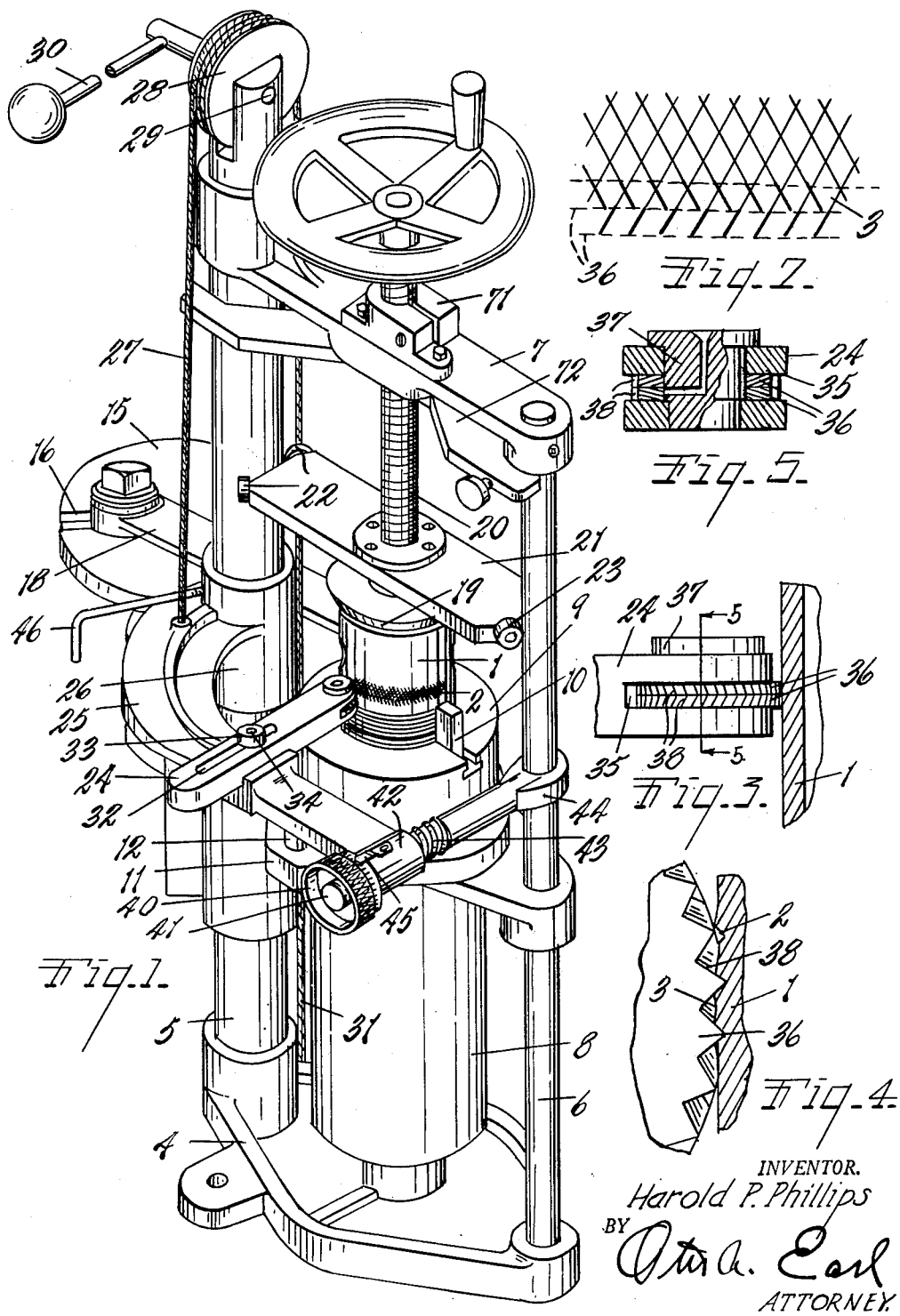

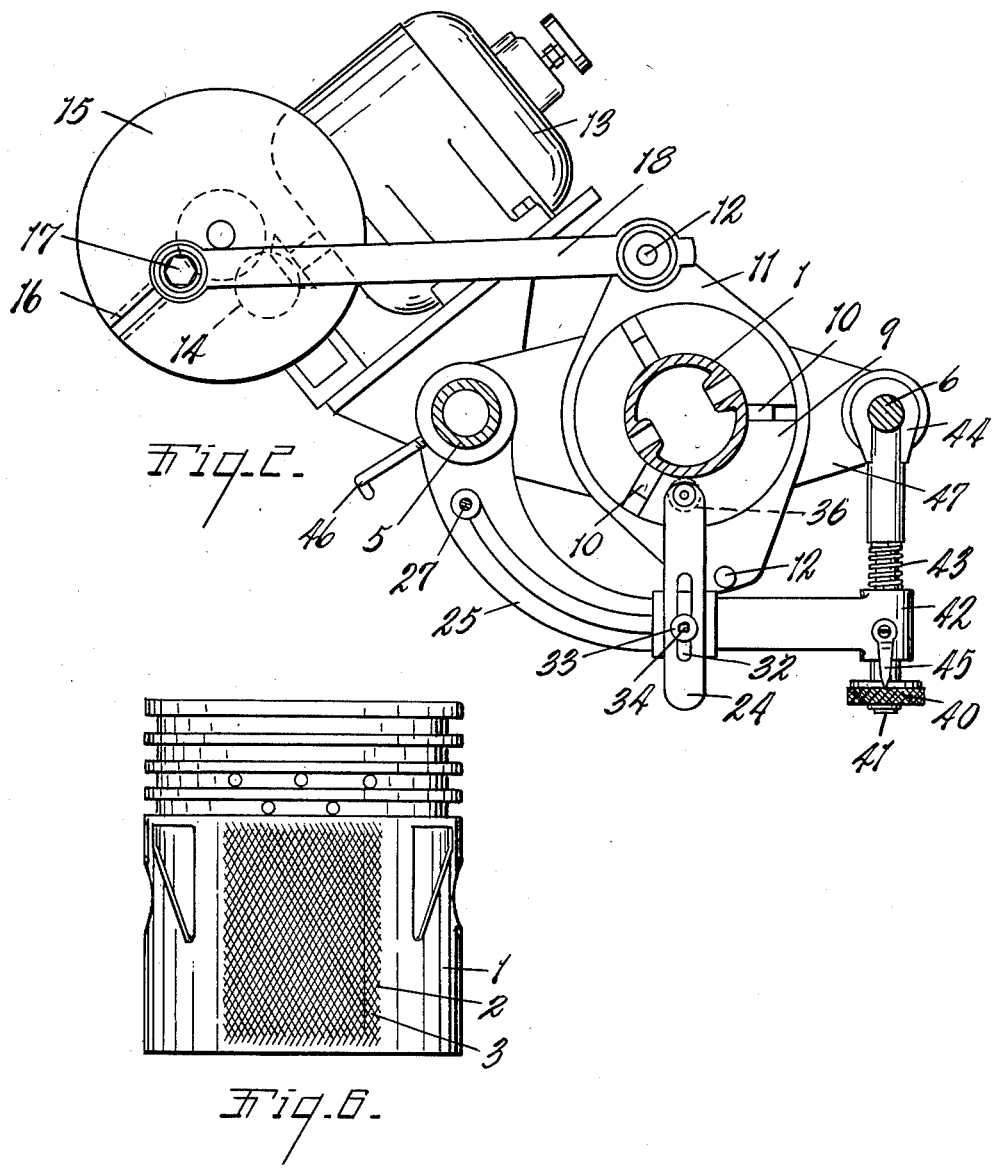

2,677,977

UNITED STATES PATENT OFFICE 2,677,977

MACHINE, TOOL, AND METHOD OF RESIZING PISTONS AND THE LIKE

Harold P. Phillips, Hastings, Mich., assignor to Hastings Manufacturing Company, Hastings, Mich.

Application November 6, 1951, Serial No. 255,071

8 Claims. (Cl. 80—5.1)

This invention relates to improvements in a machine, tool and method of resizing pistons and the like.

The main objects of this invention are:

First, to provide a machine for resizing internal combustion engine pistons by knurling the wall thereof.

Second, to provide a machine for this purpose in which the knurled area or surface is very uniformly enlarged and presents a relatively large peripheral wear surface or area.

Third, to provide a machine for expanding or resizing pistons which does not require a highly skilled operator.

Fourth, to provide a knurling tool which is highly efficient for producing diamond knurls while permitting the work to be driven with a reciprocating or oscillating stroke.

Fifth, to provide a method of resizing pistons which results in a uniform quality of work and in producing a uniformly expanded area having a desirable wearing surface.

Objects relating to details and economies of the invention will appear from the description to follow. The invention is pointed out in the claims.

A preferred embodiment of the invention is illustrated in the accompanying drawings, in which:

Fig. 1 is a perspective view of a machine embodying the invention with an internal combustion engine piston mounted thereon and showing an initial work stroke.

Fig. 2 is a horizontal cross sectional view of the machine with the parts in the position shown in Fig. 1.

Fig. 3 is an enlarged fragmentary view, the piston being shown in vertical section with a knurling tool in operative relation thereto.

Fig. 4 is an enlarged fragmentary view of the knurling tool.

Fig. 5 is an enlarged sectional view of the knurling tool on a line corresponding to line 5—5 of Fig. 3.

Fig. 6 is a side elevational view of a piston knurled by the method and apparatus.

Fig. 7 is an enlarged fragmentary elevational view showing the further details of the knurled surface.

The machine of the present invention is in general that illustrated and described in my application for Letters Patent Serial Number 166,700, filed June 7, 1950, now Patent Number 2,653,495. It is pointed out in that application that it has been previously proposed to resize or alter the effective diameter of pistons of an internal combustion engine by knurling portions of the side walls of the pistons. In the machine of my said application the knurling is in the form of a series of parallel lines of knurling cuts which are produced by a knurling cutter having teeth extending diagonally or in an inclined relation to its axis.

The machine and cutter of the present application is designed to produce a continuous knurl of a diamond pattern. A knurled piston or piece of work 1 is shown in Fig. 6, the knurled surface thereof being shown at 2. Fig. 7 is a diagrammatic illustration of the manner in which the machine operates to produce the diamond patterned knurled resized surface in which the diamond-shaped parts 3 are raised relative to the surface of the area prior to knurling.

The machine illustrated comprises a base 4 which is designed to be mounted on a suitable support such as a bench or platform. The base carries the main upright 5 and an auxiliary upright 6 which is disposed in parallel relation to the main upright. These uprights are connected at their upper ends by the crosspiece 7. The headstock 8 is provided with a work chuck 9 having work clamping jaws 10. The details of adjusting the jaws form no part of the present invention and are therefore not illustrated herein.

The chuck or headstock is designed for supporting different sizes of pistons. The chuck is provided with a double crank arm 11 having diametrically opposite wrist pins 12. The chuck is oscillated from the electric motor 13 which is connected through suitable reducing gear indicated at 14 in Fig. 2 to the crank disc 15 having a radial slot 16 therein adjustably receiving the crank pin 17, and the pitman or connecting rod 18 engaged with one or the other of the wrist pins 12. With this arrangement the chuck is driven with an oscillating movement, the length of the oscillating stroke being determined by the position of the crank pin 17 radially of the crank disc.

To center and steady the work in coacting relation to the jaws 10 I provide a tailstock comprising a centering work engaging cone 19 to which the quill or screw 20 is rotatably connected. The tailstock is provided with a steady bar 21 which has rollers 22 and 23 at its ends coacting with the uprights 5 and 6. The screw or quill 20 has threaded engagement with the nut 71 carried by the crosspiece 7. The vertical adjustment of the tailstock permits the machine to accommodate pistons of different lengths and securely clamps the work upon the chuck. It is contemplated that the cone members 19 of different sizes will be provided to coact with a wide range of piston diameters. The conical shape enables it to engage work of diameters which do not exceed the range of the particular cone. A thrust bar 72 is provided for the screw 20.

The knurling tool holder 24 is carried by an arm 25 swingably and slidably mounted on the upright 5 and provided with an elongated bearing 26. The arm is vertically adjusted by means of the cable 27 which is moved over the pulley 28 journaled at 29 on the upper end of the upright 5, the pulley being provided with a lever or handle 30 for rotating it. The cable is wrapped around the pulley and its end 31 provided wtih a counterweight (not illustrated). The tool holder 24 is longitudinally slotted at 32 to engage the stud 33 having a clamping nut 34 thereon.

The tool holder 24 has a longitudinal slot 35 opening at its inner end and of a width to receive and laterally support the pair of cutters 36. These cutters 36 are independently rotatable upon the pin 37 and are of uniform thickness and disposed in side by side relation. These cutters are of the same diameter and are provided with oppositely inclined teeth 38. The teeth are of the same shape and the same spacing. The oscillating stroke of the chuck or headstock has been described.

The tool is fed to the work by means of the feed nut 40 and the screw 41 which passes through a boss 42 on the end of the arm 25. The spring 43 on the screw biases the arm 25 outwardly. The screw 41 is slidably mounted on the upright 6 at 44. The boss 42 carries a pointer 45 coacting with graduations on the feed nut 40. A setscrew 46 is provided for clamping the arm bearing member 26 to the upright 5 which may be desirable in adjusting the machine to the work.

With the work in the machine the tool holder is properly adjusted and the tool pressed against the work with initial driving pressure for the adjustment of the feed nut 40. The motor is then started (the motor control not being illustrated) which oscillates the work through the predetermined stroke, the stroke being determined by the positioning of the crank pin 17, and the feed nut is adjusted to secure the desired depth of cut.

When the desired depth of cut is secured the tool is adjusted axially of the work. The result is that a diamond pattern is cut or formed on a continuously knurled surface as shown at 2 in Fig. 6. The workman soon acquires the necessary skill to determine the proper depth of cut and to feed the tool axially of the work. This in practice is readily determined by the feel although if desired a gauge or gauging indicia can be provided. That, however, is not illustrated as the machines in commercial use are not equipped with that feature.

During the reversal of the stroke and the feeding of the knurling tool axially of the work the tool is kept under constant cutting pressure. The cutters are shown in Fig. 3 with their teeth in register but this is not necessary to produce the diamond-shaped knurls as is diagrammatically shown in Fig. 7. It is necessary in maintaining the pattern that the contact of the tool be maintained with the work as the work is oscillated. In effect the cuts of the teeth of one cutter cross the cuts of the teeth of the other cutter.

The machine illustrated is highly practical for the practice of the method of the invention. The knurled surface thus produced presents a multiplicity of raised diamond-shaped areas and results in very uniformly increasing the diameter of the treated area. After one side of the piston has been knurled the knurling tool is disengaged from the piston, the pitman or connecting rod disconnected from the pin 12, the chuck turned 180° and the pitman engaged with the other pin 12. It should be noted that only one chucking operation is required for each piston.

I have illustrated and described a highly practical machine for performing the method of my invention and my improved knurling tool. I have not attempted to illustrate various forms or variations of the machine as it is believed that this disclosure will enable those skilled in the art to embody or adapt the invention as may be desired.

Having thus described my invention, what I claim as new and desired to secure by Letters Patent is:

1. In a machine for knurling pistons, the combination of an upright, a rotatable work chuck disposed with its axis in spaced parallel relation to said upright, driven means for oscillating said work chuck, a tool carrying arm mounted on said upright for vertical sliding and swingable adjustment thereon, a tool holder mounted on said arm for longitudinal adjustment and radially relative to the axis of the work, manually adjusted tool feed means for said arm, manually actuated means for vertically adjusting said tool carrying arm on said upright for positioning the tool carried thereby longitudinally relative to the work, and a knurling tool mounted on said tool holder and comprising a pair of disc-like cutters of the same diameter disposed in side by side contacting relation, and independently rotatable on the same axis, said cutters having equally spaced elongated teeth, the teeth of one cutter being oppositely inclined relative to the other so that the teeth of the cutters are aligned so they coact in producing V-shaped cuts in the work as they are translated relative to the work.

2. In a machine for knurling pistons, the combination of an upright, a rotatable work chuck disposed with its axis in spaced parallel relation to said upright, driven means for oscillating said work chuck, a tool carrying arm mounted on said upright for vertical sliding and swingable adjustment thereon, a tool holder mounted on said arm, manually adjusted tool feed means for said arm, manually actuated means for vertically adjusting said tool carrying arm on said upright for positioning the tool carried thereby longitudinally relative to the work, and a knurling tool mounted on said tool holder and comprising a pair of disc-like cutters of the same diameter disposed in side by side contacting relation, and independently rotatable on the same axis, said cutters having equally spaced elongated teeth, the teeth of one cutter being oppositely inclined relative to the other so that the teeth of the cutters are aligned so they coact in producing V-shaped cuts in the work as they are translated relative to the work.

3. A knurling tool comprising a cutter holder having a slot opening at its inner end, a bearing pin extending transversely of the slot, and a pair of disc-like cutters disposed in side by side contacting relation and independently rotatable on said pin, said cutters being of the same diameter and having equally spaced elongated axially inclined teeth, the teeth of one cutter inclined oppositely from those of the other cutter.

4. A knurling tool comprising a cutter holder, a bearing pin on said holder, and a pair of disc-like cutters disposed in side by side contacting relation and independently rotatable on said pin, said cutters being of the same diameter and having equally spaced axially inclined outwardly tapered elongated teeth extending from edge to edge thereof, the teeth of one cutter being inclined oppositely to the teeth of the other cutter.

5. A knurling tool comprising a cutter holder, a bearing pin on said holder, and a pair of disc-like cutters disposed in side by side contacting relation and independently rotatable on said pin, said cutters being of the same diameter and having equally spaced elongated axially inclined teeth, the teeth of the cutters being uniformly spaced and oppositely inclined relative to the axis of their axis of rotation whereby when the cutter is translated to the work the cutters coact to produce V-shaped angled cuts in the work.

6. A knurling tool comprising a cutter holder, and a pair of axially aligned cutters mounted on said holder, said cutters being of the same diameter and having equally spaced axially inclined elongated teeth, the teeth of one cutter being oppositely inclined from the teeth of the other cutter, said cutters being independently rotatable so that the teeth are free to align when translated upon and relative to the work and the cutters coacting to provide V-shaped cuts at each such translation.

7. In a machine for knurling pistons, the combination of an oscillatable work chuck, means for oscillatingly driving said work chuck with strokes less than 360 degrees in length, a tool holder mounted for adjustment axially of the work, manually actuated means for adjusting said tool holder for positioning a tool carried thereby axially of the work, tool feed means for adjusting said tool holder to and from the work independently of the aforesaid axial adjustment thereof, and a knurling tool rotatably mounted on said tool holder with its axis parallel to the axis of the work chuck and comprising a pair of independently rotatable axially aligned cutters of the same diameter disposed in side by side contacting relation and having equally spaced elongated axially inclined teeth, the teeth of one cutter being inclined oppositely from the teeth of the other cutter and at the same angle so that the two cutters coact when the adjacent ends of the teeth are aligned in forming a series of angled cuts as the work is oscillatingly translated relative to the cutters.

8. In a machine for knurling pistons, the combination of a rotatable work chuck, means for oscillatingly driving said work chuck, a tool holder mounted for adjustment axially of the work, manually actuated means for adjusting said tool holder for positioning a tool carried thereby axially of the work, tool feed means for adjusting said tool holder radially of the work in its several positions of axial adjustment relative to the work and independently of the aforesaid axial adjustment thereof and while the work is being oscillatingly driven, and a knurling tool rotatably mounted on said tool holder with its axis parallel to the axis of the work chuck and comprising a pair of independently rotatable axially aligned cutters of the same diameter disposed in side by side contacting relation and having equally spaced elongated axially inclined teeth, the teeth of one cutter being inclined oppositely from the teeth of the other cutter and at the same angle so that the two cutters coact when the adjacent ends of the teeth are aligned in forming a series of angled cuts as the work is oscillatingly translated relative to the cutters.

References Cited in the file of this patent

UNITED STATES PATENTS

| Number | Name | Date |
| --- | --- | --- |
| 934,335 | Nahm et al. | Sept. 14, 1909 |
| 1,369,792 | Djidics | Mar. 1, 1921 |
| 1,623,662 | Dover | Apr. 5, 1927 |
| 1,877,530 | Read | Sept. 13, 1932 |
| 2,335,316 | Shepard | Nov. 30, 1943 |